July 31, 1951     O. M. ARNOLD     2,562,373
METHOD OF FORMING THIN FLEXIBLE POLYAMIDE ARTICLES
Filed Sept. 19, 1945
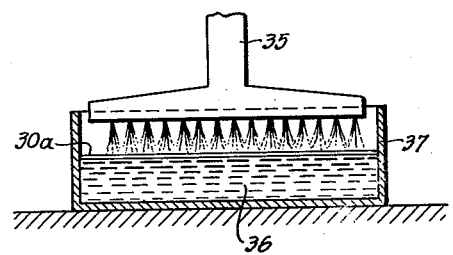
Inventor
ORLAN M. ARNOLD
By Curtis Morris & Safford
Attorneys

Patented July 31, 1951

2,562,373

UNITED STATES PATENT OFFICE 2,562,373

METHOD OF FORMING THIN FLEXIBLE POLYAMIDE ARTICLES

Orlan M. Arnold, Grosse Pointe Park, Mich.

Application September 19, 1945, Serial No. 617,434

5 Claims. (Cl. 18—57)

This invention relates to solutions of nylon and polyamide material, more especially scrap nylon, to the use of the same and to correlated improvements and discoveries appertaining thereto.

It has been observed and reported, e. g. in Patent No. 2,071,251 that the polyamides produce rather brittle, partially crystalline materials unless subjected to "cold drawing" by which high orientation of its molecules is produced.

I have found that solutions of the polyamides, when spread in a thin form and the solvent removed suddenly by leaching therefrom with a liquid which does not dissolve the polyamide, yield products of a novel character which may have a desirable fibrous nature resembling fine parchment, or lace, etc., depending upon the conditions of the treatment by which it is formed. If the solution is carried as a thin film on the fibers of a fibrous, e. g. a textile, product, another object may be achieved, i. e., production of fabrics, films and fibers of improved "feel" or texture, improved strength and excellent flexibility, resiliency and softness. In such treatment the oriented condition of the fiber or film to which the solution is applied apparently influences the orientation of the polyamide molecules so that even with air drying, and notwithstanding that "cold drawing" or stretching of the applied polyamide is not feasible, the material is strong, flexible and resilient.

One object of the invention is to widen the field of use of nylon and like materials. Another object is the provision of fabrics, fibers and fibrous materials having improved qualities which render them particularly effective and desirable for use in wearing apparel and other textiles as well as for various industrial applications. Another object is the more effective utilization of waste nylon. Other objects will in part be obvious and will in part appear hereinafter.

The drawing is a schematic representation of an apparatus carrying out one procedure embodying the invention.

In accordance with the invention, nylon may be made especially or new nylon may be used in accordance with the invention and for the formation of products embodying the invention, economic considerations will ordinarily dictate the use of scrap nylon which is admirably suited for such use.

This polyamide, whatever its source, is dissolved to form a liquid solution of appropriate viscosity for spreading out into a thin film, the particular solvent being chosen to be compatible with the base on which the film is to be spread. In its broadest aspect my invention may be used with any solvent of the polyamide which is compatible with the base; but I have also found that particular solvents have particular advantages for particular purposes as hereinafter set forth.

Reference has been made above to the spontaneous development of a fibrous character in applied films of the polyamide solution when leached before drying. I can take advantage of this for production of novel films and filaments apart from any fibrous base. When solutions of the polyamide are flowed smoothly into contact with a body of liquid which is miscible with the solvent of said solution but does not dissolve the polyamide, there results a throwing out of the polyamide in an oriented form having characteristics of stretched fibers or films. Such a solution flowed onto the surface of a quiet body of the liquid spreads into a uniform film, then quickly loses its solvent leaving a tough film almost like parchment, which may be thin and lace-like or dense and tough depending upon the thickness and concentration of the film of the solution and the nature of the supporting liquid.

For example, waste nylon may be dissolved in cresol and films formed by spreading this solution on water, alcohol, ether or other liquid miscible with cresol but which does not dissolve or decompose the polyamide. Very tough, thin, soft, parchment-like films are provided by dissolving nylon in ortho-, meta-, or para-cresol (or mixtures of them) and spreading the solution on water. The solution spreads out evenly of its own accord, somewhat like oil on water. The film formation may be speeded up by heating the water, e. g. almost to its boiling point, or in other liquids even beyond 100° C. Thicker films may be provided by using a denser solution. In general it is well to use for such bath a liquid of higher specific gravity than the solution, although surface tension will hold even a heavier film on the surface. To this end, various materials may be dissolved in the liquid to increase its specific gravity to prevent a heavy surface film from cracking and falling through the bath. In other cases surface tension is sufficient to assure support of a much heavier film. The water or other liquid provides the support for the polyamide and at the same time permits excess solvent to separate itself therefrom with extreme ease and rapidity. The cresol for example merely drops through the water away from the film. The nature of the liquid bath is important to the texture of the product, as the phenomonon is partly due to the surface tension between the polyamide solution and the bath.

Combinations of nylon and styrene may be similarly dissolved in cresol and spread on the surfaces of a liquid or of a solvent. Desirably 2–40% styrene should be used, with 5–10% a preferred range.

If nylon solutions are released under water from spinnerets or even by dropping from a sufficient height to get the nylon below the surface, it shoots out into filaments of its own accord.

Other solvents may be used for the bath. For instance, alkyl, arylalkyl and other compounds may be employed to give similar results. Tough, transparent, microscopic films have been formed from nylon dissolved in glacial acetic acid and in formic acid (hot or cold) when spread onto or passed into a water bath. Modified products may be produced in accordance with the invention by the use of low-density solvents, such for example as acetone and ether, alone or in the form of saturated solutions in water as well as other organic solvents and mixtures of them. In this case lacey, open-work films with fine fibrils of tough nylon in beautiful random patterns may be formed on the surface of water or on other suitable surface. These are unitary whereas ordinary nylon lace is composed of separate threads and separate fibers. These are excellently adapted for use as decorative appliqués in plastic film form or as lace fabric. The acetone, ether, etc., has the ability of setting the nylon quickly and effectively.

The invention further contemplates the use of this property of such solvents as acetone, ether, and the like to set the polyamide in the extrusion of fibers. For example, a solution of a polyamide, e. g. of scrap nylon is extruded into acetone, ether, etc., which act to set immediately as it comes out of the orifices in film form. Care should be taken to have the polyamide under tension immediately upon its entry into the acetone, ether or other liquid so that it is not set in unstretched form.

Alcohol is ordinarily not recommended for use with liquid cresol solutions as it tends to give a flaky or powdery product.

The solution may be sprayed by a controlled velocity means 35 onto a uniformly flowing stream of water 36 in a trough 37 as shown in the drawing.

Films such as the foregoing, and other desirable products, may also be formed by dissolving nylon and other fibers of the types employed in manufacturing textile fabrics in a zinc chloride solution or solution of other metallic salts such for instance as sodium iodide, calcium nitrate, various thiocyanates, especially sodium thiocyanate, and the like. Desirable products have been formed by dissolving silk in $ZnCl_2$ and mixing the resulting solution with a viscose solution (cellulose sodium xanthate). Alternatively, cellulosic material and silk may be simultaneously dissolved with zinc chloride. Individual textile-fiber organic complexes may be dissolved with zinc chloride.

When viscose or other cellulosic material and other textile-fiber organic complexes are dissolved together and the solution suddenly diluted, the coordinate valences of the fiber molecules tend to be tied together. The zinc chloride solutions of fiber complexes may be spun or precipitated in a water bath as above.

While as above indicated, nylon from any desirable source including newly formed nylon may be utilized in accordance with the invention waste nylon is excellently adapted for such use. An excellent source of waste polyamide material consists of used stockings both because of their short active life and their small degradation in use. Parachute cloth is also a desirable source for similar reasons. In such cases the goods should be thoroughly washed before use. Molded plastics, molding scrap, sheets, rods, screen, etc., may also be used.

Although I have given above certain specific examples of my invention and its application in practical use and have disclosed also certain modifications and alternatives, it should be understood that these are not intended to be exhaustive or to be limiting of the invention. On the contrary, I have given these as illustrations which together with explanations herein are intended so fully to acquaint others skilled in the art with my invention and the principles thereof and a suitable manner of its application in practical use, that they may be enabled to modify the invention and to adapt it and apply it in numerous forms, each as may be best suited to the requirements of a particular use.

I claim:

1. The process of forming a thin flexible material of a linear polyamide super-polymer which comprises forming a solution of the polymer and floating a thin stream of the solution by a body of a supporting liquid in which said solvent is readily soluble but which is not a solvent of and does not decompose the polymer.

2. The process of forming films of a linear superpolymer which comprises forming a solution of said polymer and floating a layer of the solution on a body of liquid which is miscible with the solvent of said solution but is non-solvent of, and does not decompose, said polymer.

3. The process of forming fibers of a linear polyamide super-polymer which comprises forming a solution of said polymer in a solvent of relatively low specific gravity, floating a filament of the solution by a body of liquid of higher specific gravity in which the solvent of said solution is readily soluble but which is non-solvent of, and does not decompose, said polymer.

4. The process of forming fibrous polyamide material which comprises dissolving nylon in a non-degrading solvent therefor which is miscible with a non-solvent liquid which will float the nylon, and floating a relatively small quantity of the solution on a large quantity of such a non-solvent liquid and washing the solvent out of the nylon by the non-solvent liquid.

5. The process of forming fibrous polyamide material which comprises dissolving nylon in non-degrading solvent therefor which is miscible with a non-solvent liquid, and spreading the solution thinly on the surface of such a non-solvent liquid, and washing the solvent out of the nylon by the non-solvent liquid.

ORLAN M. ARNOLD.

REFERENCES CITED

The following references are of record in the file of this patent:

UNITED STATES PATENTS

| Number | Name | Date |
|---|---|---|
| Re. 22,650 | Bley | Jan. 12, 1945 |
| 826,781 | Gregory | July 24, 1906 |
| 934,214 | Ratignier et al. | Sept. 14, 1909 |
| 950,435 | Chavassieu | Feb. 22, 1910 |
| 2,130,948 | Carothers | Sept. 20, 1938 |
| 2,137,235 | Carothers | Nov. 22, 1938 |
| 2,141,169 | Catlin | Dec. 27, 1938 |
| 2,166,205 | Anderson et al. | July 18, 1939 |
| 2,169,097 | Hall et al. | Aug. 8, 1939 |
| 2,188,332 | Carothers | Jan. 30, 1940 |
| 2,191,367 | Carothers | Feb. 20, 1940 |
| 2,244,184 | Austin et al. | June 3, 1941 |
| 2,324,838 | Harz | July 20, 1943 |
| 2,357,392 | Francis | Sept. 5, 1944 |
| 2,361,369 | Grebe et al. | Oct. 31, 1944 |

OTHER REFERENCES

Handbook of Chemistry and Physics, 26th ed.; Chemical Rubber Publishing Co., 1942.